United States Patent Office 3,495,491
Patented Feb. 17, 1970

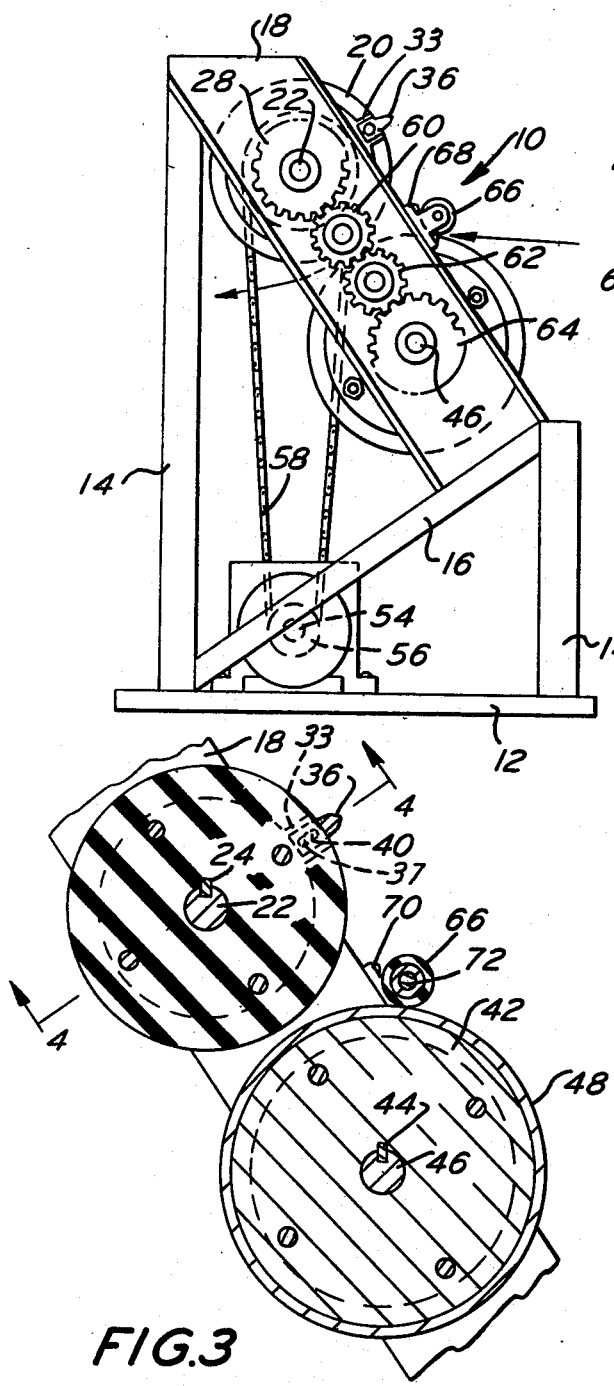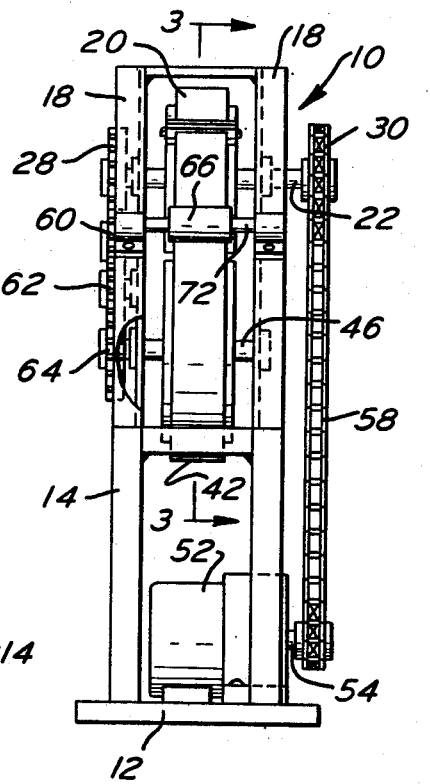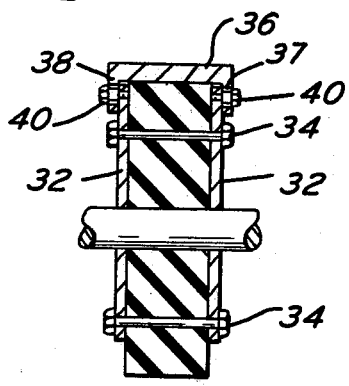

3,495,491
CUTTER
Harvey J. Nungesser, Norristown, Pa., and Francis J. Rielly, Cherry Hill, N.J., assignors to Nypel, Inc., West Conshohocken, Pa., a corporation of Delaware
Filed July 17, 1967, Ser. No. 653,893
Int. Cl. B23d 25/12
U.S. Cl. 83—346       1 Claim

ABSTRACT OF THE DISCLOSURE

A cutter for filaments containing abrasive substances including a rotating knife and a rotating anvil. A pinch roller cooperates with the anvil to feed the filaments containing abrasives into the cutting zone. The cutter and anvil are rotated at substantially the same surface speed which corresponds with the speed of movement of the filaments to be cut. An interference of approximately .015 to .020 inch between the knife and the anvil is provided at the cutting zone. The interference is necessary in order to insure that the knife will thoroughly sever the filaments containing abrasives. The drive mechanism includes means for causing the knife to contact the anvil at various spaced points along the periphery of the anvil. The outer periphery of the roller upon which the knife is mounted is composed of a tough resilient elastomeric material and the outer surface of the anvil is composed of hard metal. The pinch roller is composed of a hard elastomeric material.

The present invention relates to a cutter and more particularly to a cutter adapted to cut filaments containing abrasives.

It is desirable to manufacture filaments containing abrasives in a continuous process. The filaments or strands containing abrasives may be extruded at a rate of approximately 360 linear feet per minute. The abrasive within the filaments include such materials as aluminum oxide, diamond grit, tungsten carbide, etc. The filaments are composed of a thermoplastic material which encapsulates the abrasive grit. Conventional cutters such as those with steel cutting blades have not proven satisfactory in cutting the filaments into desired unit lengths. It has been found that a steel cutting blade is rapidly dulled due to the abrasiveness of the grit contained within the filaments. It has further been determined that a shearing action has proven unsatisfactory since the life of the blade utilized is relatively short and replacement of the blade necessitates undesirable delays in the process.

It is an object of the present invention to provide a cutter for filaments containing abrasives which overcomes the deficiencies of prior art cutters.

It is another object of the present invention to provide a cutter for filaments containing abrasives which rapidly and efficiently pinch cuts the filaments.

It is still another object of the present invention to provide a cutter for filaments containing abrasives wherein the cutter will effectively and efficiently cut multiple filaments moving at a speed of 360 linear feet per minute.

It is a further object of the present invention to provide a cutter for filaments containing abrasives which is relatively inexpensive to manufacture and highly effective in use.

Other objects will appear hereinafter.

The above and other objects are accomplished by means of the present invention. The cutter includes a rotating wheel having a cutter attached thereto. The cutter is in the form of a chisel knife. A rotating anvil is mounted adjacent the wheel upon which the knife is mounted and a cutting zone is defined therebetween. The anvil has a hard metal surface thereon. The anvil may be a solid metal wheel or may have a core of lightweight material covered with a hard metal liner. If a liner is utilized, means would be provided for easily replacing the liner. A pinch roller is provided immediately adjacent the anvil. The pinch roller cooperates with the anvil to feed the filaments containing abrasives into the cutting zone.

At the cutting zone, an interference is provided between the chisel knife and the anvil of approximately .015 to .020 inch. This insures an effective pinch cut of the filaments. In order to prolong the life of the anvil, means are provided for insuring that the blade will not contact the same location on the anvil upon each rotation thereof. To this end an extra tooth is provided on the gear to which the anvil is connected. The diameter of the anvil will also be somewhat larger to insure that the surface feed of the anvil will be substantially the same as the surface speed of the cutting knife. It is preferred that the surface of the knife and anvil will be substantially the same as the speed of the filaments to minimize wear of the anvil.

The blade is mounted across the surface of the blade supporting roller. The blade supporting roller is composed of a tough resilient elastomeric material. Thus, in the cutting zone, the jolt of the blade due to interference with the anvil will be absorbed by the tough elastomeric material.

For the purpose of illustrating the invention there is shown in the drawings a form which is presently preferred; it being understood, however, that this invention is not limited to the precise arrangements and instrumentalities shown.

FIGURE 1 is a side elevation view of the cutter of the present invention;

FIGURE 2 is a front elevation view of the cutter of the present invention;

FIGURE 3 is a section view taken along line 3—3 of FIGURE 2; and

FIGURE 4 is a section view taken along line 4—4 of FIGURE 3.

Referring now to the drawings in detail wherein like reference numerals refer to like elements there is shown in FIGURES 1 and 2 a cutter generally designated by the reference numeral 10. The cutter 10 includes a frame 12 and upright standards 14. The cutter is provided with suitable diagonal supports 16. Casing members 18 are provided on opposite sides of the cutter for housing various components of the drive mechanism for the cutter.

The cutter 10 includes a first roller or wheel 20 which is composed of a hard resilient elastomeric material. The roller 20 is keyed to a shaft 22 by means of a key 24. Suitable bearings are provided for the shaft 22. The shaft 22 is supported by the casing members 18. A gear 28 is secured to one end of the shaft 22 and a gear 30 is secured to the other end of the shaft.

A pair of plates 32 are secured to the sides of the roller 20 by means of bolts 34. The plates 32 have extensions 33 thereon. The extensions 33 have internally threaded holes therein. A chisel knife 36 extends across the face of the roller 20 and is secured to the plates 32 by means of downwardly depending arms 38 (see FIGURE 4). The arms 38 have elliptical openings 37 therein. The downwardly depending arms 38 are secured to the plates 32 by means of bolts 40. Bolts 40 extend through the elliptical openings 37 and threadingly engage the internally threaded holes in the extensions 33. The elliptical openings permit the blade 36 to move slightly upon contact with anvil roller or wheel 42. The hard resilient material of which wheel 20 is composed will return the knife 36 to its desired position.

Anvil roller or wheel 42 is keyed to a shaft 46 by means of a key 44. The shaft 46 is supported at its ends by the casing member 18. The anvil 42 may be provided with a liner 48 of a hard metal. Alternatively, the anvil 42 may be a solid metal roller. Wherein the liner 48 is utilized, means will be provided for easily replacing the liner. Suitable bearings are provided for the shaft 46.

A motor 52 is mounted on the frame 12 of the cutter 10. The motor 52 has an output shaft 54 connected thereto. A pinion 56 is fixedly connected to the output shaft 54 of the motor 52. A chain 58 is adapted to interconnect the pinion 56 and the gear 30 which is fixedly connected to the shaft 22. Rotation of the output shaft 54 will cause rotation of the pinion 56 which will be transmitted to the roller 20. Rotation of the roller 20 will cause rotation of the gear 28. The gear 28 meshes with a pair of idler gears 60 and 62. Idler gear 62 meshes with gear 64 which is fixedly connected to shaft 46. Rotation of the shaft 46 will cause rotation of the anvil roller 42. As is clear from FIGURE 1, the roller 20 and the anvil 42 will rotate in opposite directions.

The gear 64 is provided with one tooth more than the gear 28. This will result in the chisel knife 36 contacting the anvil 42 at a different location on the surface of the anvil upon each successive rotation of the rollers 20 and 42. In order of maintain the surface speed of the anvil substantially the same as the surface speed of the chisel knife 36, the radius of the anvil roller is slightly greater than the distance from the center of the roller 20 to the edge of the chisel knife 36.

A pinch roller 66 is mounted adjacent the anvil roller 42 and is adapted to cooperate therewith to feed material to be cut into the cutting zone. A bracket 68 is secured to casing members 18 and supports the pinch roller 66. The bracket 68 may be secured to the casing members 18 by any suitable means such as bolts 70 or the like. The pinch roller has an outer surface thereon which is composed of a hard elastomeric material. Filaments containing abrasives which are to be cut are fed between the pinch roller 66 and the anvil 42 as illustrated by the arrows in FIGURE 1. The filaments are gripped between the rotating anvil 42 and the pinch roller 66 and are fed into the cutting zone at a predetermined rate. The pinch roller 66 is supported by and freely rotatable on a shaft 72. The chisel knife 36 is easily replaced by removing the bolts 40 thus enabling removal of the chisel knife 36 from the roller 20. It is clear that a new knife may be mounted on the roller 20 by simply securing a new knife thereto by means of bolts 40.

The operation of the cutter is apparent from the above description. When it is desired to cut material the motor 52 is energized. This will cause rotation of the output shaft 54 and pinion 56 integral with the motor. The chain 58 will transmit rotation to gear 30 secured to shaft 22. Rotation of the shaft 22 will cause rotation of the roller 20 upon which the chisel knife 36 is mounted. Rotation of the shaft 22 will be transmitted through the gear 28 and idlers 60 and 62 to the gear 64. The gear 64 will cause rotation of the shaft 46 which is secured to the anvil roller 42. Thus, the anvil roller 42 will rotate in an opposite direction from the direction of rotation of the roller 20.

Since the gear 54 is provided with one tooth more than the gear 28 the chisel knife 36 on the roller 20 will not contact the same location on the anvil 42 upon each successive rotation of the roller 20. The chisel knife 36 will contacts the anvil 42 to pinch cut the filaments containing inch apart along the surface thereof upon each successive rotation of the rollers 20 and 42.

At the cutting zone, which is where the chisel knife 36 contacts the anvil 42 to pinch out the filaments containing abrasives, an interference of .015 to .020 inch is provided to insure that the filaments are completely severed. The filaments are fed to the cutting zone at a desired speed as a result of the cooperation between the rotating anvil and the freely rotatable pinch roller 66 which grips the filaments therebetween and feed the same into the cutting zone. The filaments will normally be moving at a predetermined rate of speed prior to delivery thereof to the cutter 10. When this is the situation, the pinch roller and anvil will primarily cooperate to keep the filaments in proper orientation and feed the filaments to the cutting zone.

In the preferred embodiment the roller 20 is composed of an elastomeric material having a durometer hardness of 70–90, the knife blade will be cutlery grade steel, and the pinch roller is composed of an elastomeric material having a durometer hardness of 70–90. It is also preferred that the anvil surface be composed of a readily replaceable steel liner.

While the cutter of the present invention is particularly adapted to cut filaments containing abrasives, it may be used for cutting other materials without departing from the scope of the invention.

We claim:

1. Apparatus for cutting filaments containing abrasives and the like comprising a frame, a first rotatable roller supported by said frame, said roller having a resilient outer surface, at least one knife mounted on said resilient outer surface, a second rotatable roller supported on said frame including a removable outer metal anvil surface, the axis of rotation of said first and second rollers being substantially parallel, said rollers being so mounted as to provide a cutting zone therebetween and to provide an interference of about 15 to 20 thousandths of an inch between said knife and said anvil surface, said resilient outer surface of said first rotatable roller being slightly yieldable to absorb shock when said knife contacts said anvil surface of said second rotatable roller at said cutting zone, said second roller having a radius slightly different than the distance from the center of said first roller to the edge of said knife; means for rotating said first and second rollers at speeds such that said knife and said anvil surface move at substantially the same tangential rate of speed and said knife contacts said anvil surface at a different point around the circumference thereof with each successive revolution, a pinch roller mounted closely adjacent said anvil surface, the axis of rotation of said pinch roller being susbtantially parallel to the axis of rotation of said first and second rollers, said pinch roller cooperating with said anvil surface for feeding material to be cut between the pinch roller and the anvil to said cutting zone, said pinch roller having a surface thereof of soft resilient material to reduce the abrasive effect of the material to be cut on the surface of said pinch roller and thereby prolong the useful life of said pinch roller, whereby strands of abrasive material are positively fed to and pinch cut by said anvil and knife with a minimum amount of abrasive wear on the movable parts of said apparatus.

References Cited

UNITED STATES PATENTS

| 461,600 | 10/1891 | West | 83—348 |
|---------|---------|------|--------|
| 1,260,694 | 3/1918 | Marresford | 83—346 X |
| 1,876,838 | 9/1932 | Biggert | 83—346 X |
| 2,084,573 | 6/1937 | Cowan | 83—346 X |
| 2,390,426 | 12/1945 | Davidson | 83—348 |
| 2,729,028 | 1/1956 | Slayter et al | 83—347 X |
| 2,745,491 | 5/1956 | Sonneborn et al | 83—346 X |
| 3,111,875 | 11/1963 | Kokuji Takehara | 83—346 X |
| 3,151,513 | 10/1964 | Rowlands | 83—348 X |

JAMES M. MEISTER, Primary Examiner

U.S. Cl. X.R.

83—348, 561, 659